(12) United States Patent　　(10) Patent No.: US 11,906,783 B2
Yamashita et al.　　(45) Date of Patent: Feb. 20, 2024

(54) CORE POSITION GRASPING METHOD, CONNECTION METHOD, AND CONNECTION DEVICE

(71) Applicant: NIPPON TELEGRAPH AND TELEPHONE CORPORATION, Tokyo (JP)

(72) Inventors: Yoko Yamashita, Musashino (JP); Masaki Wada, Musashino (JP); Takashi Matsui, Musashino (JP); Kazuhide Nakajima, Musashino (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 126 days.

(21) Appl. No.: 17/764,239

(22) PCT Filed: Oct. 8, 2019

(86) PCT No.: PCT/JP2019/039623
§ 371 (c)(1),
(2) Date: Mar. 28, 2022

(87) PCT Pub. No.: WO2021/070241
PCT Pub. Date: Apr. 15, 2021

(65) Prior Publication Data
US 2022/0365282 A1　Nov. 17, 2022

(51) Int. Cl.
*G02B 6/293*　(2006.01)
*G02B 6/38*　(2006.01)

(52) U.S. Cl.
CPC ....... *G02B 6/29313* (2013.01); *G02B 6/3861* (2013.01)

(58) Field of Classification Search
CPC .......... G02B 6/29313; G02B 6/3861; G02B 6/3803; G02B 6/30; G02B 6/02042
See application file for complete search history.

(56) References Cited

U.S. PATENT DOCUMENTS 6,078,716 A * 6/2000 Huang ................. G02B 6/2713
　　　　　　　　　　　　　　　　　　　385/47
9,482,814 B2 * 11/2016 Nakanishi ............ G02B 6/3838
(Continued)

FOREIGN PATENT DOCUMENTS

WO　WO-2017130627 A1　8/2017

*Primary Examiner* — Andrew Jordan
(74) *Attorney, Agent, or Firm* — Harness, Dickey & Pierce, P.L.C.

(57) ABSTRACT

An object of the present invention is to provide a core position recognition method, a connection method, and a connection apparatus that can simplify connection operations, and reduce rotational displacement and positional displacement. The connection apparatus according to the present invention includes a function capable of acquiring the rotation amount of an MCF during the bonding/fixing step. Specifically, the connection apparatus of the present invention uses an MCF with lines drawn on a side surface thereof, thereby recognizing the rotation amount of the MCF from the side surface, and calculating the absolute positions of the cores. The connection apparatus according to the present invention can recognize the absolute position s of the cores from a side image of an MCF in a state in which the MCF has been rotated. By forming a waveguide on a glass substrate serving as a connection destination so as to match the absolute positions of the cores, the rotational and positional displacements of the MCF can be eliminated, thus making it possible to reduce the connection loss.

8 Claims, 7 Drawing Sheets

(56) References Cited

U.S. PATENT DOCUMENTS

| | | | | |
|---|---|---|---|---|
| 9,541,707 | B2* | 1/2017 | Saito | C03B 37/01222 |
| 9,696,513 | B2* | 7/2017 | Bennett | B29C 48/00 |
| 9,810,845 | B2* | 11/2017 | Kopp | G02B 6/26 |
| 9,958,604 | B2* | 5/2018 | Kokura | G02B 6/448 |
| 10,156,693 | B2* | 12/2018 | Benjamin | G02B 6/4403 |
| 10,634,848 | B2* | 4/2020 | Hasegawa | G02B 6/262 |
| 10,852,471 | B2* | 12/2020 | Villarreal-Saucedo | G02B 6/4296 |
| 10,955,622 | B2* | 3/2021 | Matsui | G02B 6/30 |
| 11,262,497 | B2* | 3/2022 | Villarreal-Saucedo | G02B 6/262 |
| 2015/0016791 | A1* | 1/2015 | Nagashima | G02B 6/02033 427/163.2 |
| 2015/0055913 | A1* | 2/2015 | Imoto | G02B 6/368 65/357 |
| 2015/0055923 | A1* | 2/2015 | Saito | G02B 6/2555 65/378 |
| 2016/0070058 | A1* | 3/2016 | Nakanishi | G02B 6/02395 385/98 |
| 2017/0108650 | A1* | 4/2017 | Weiner | G02B 6/30 |
| 2017/0227716 | A1* | 8/2017 | Kopp | G02B 6/30 |
| 2017/0269322 | A1* | 9/2017 | Benjamin | B29D 11/00663 |
| 2017/0285258 | A1* | 10/2017 | Kokura | G02B 6/02042 |
| 2018/0372954 | A1 | 12/2018 | Matsui et al. | |
| 2020/0379187 | A1* | 12/2020 | Matsui | G02B 6/125 |
| 2021/0041622 | A1* | 2/2021 | Ono | C03C 25/106 |
| 2022/0214495 | A1* | 7/2022 | Villarreal-Saucedo | G02B 6/02042 |
| 2022/0365282 | A1* | 11/2022 | Yamashita | G02B 6/30 |

* cited by examiner

CORE POSITION GRASPING METHOD, CONNECTION METHOD, AND CONNECTION DEVICE

CROSS-REFERENCE TO RELATED APPLICATIONS

This application is a 371 U.S. National Phase of International Application No. PCT/JP2019/039623, filed on Oct. 8, 2019. The entire disclosure of the above application is incorporated herein by reference.

TECHNICAL FIELD

The present disclosure relates to a core position recognition method, a connection method, and a connection apparatus for use when connecting a multi-core fiber.

Background Art

Methods for aligning a multi-core fiber (MCF) include a method in which rotation alignment is performed according to the positions of cores (see e.g., PTL 1). The alignment apparatus that aligns an optical fiber in this technique includes an acquisition unit, a calculation unit, and a rotation processing unit. The acquisition unit acquires a side image of the optical fiber. The calculation unit calculates correlation coefficients between a luminance of the side image and a luminance of a reference side image. The rotation processing unit rotates the optical fiber in the axial direction of the optical fiber such that the correlation coefficients peak.

CITATION LIST

Patent Literature

[PTL 1] WO 2017/130627

SUMMARY OF THE INVENTION

Technical Problem

The conventional rotation alignment is problematic in that the acquisition of a fiber end-face image and the bonding/fixing are performed in different steps, and it is difficult to control rotational displacement and positional displacement that occur in the fiber at the time of bonding a fiber fixing portion. Performing the acquisition of a fiber end-face image and the bonding/fixing in different steps complicates connection operations, and the rotational displacement and the positional displacement also result in an increased connection loss.

Therefore, in order to solve the above-described problem, an object of the present invention is to provide a core position recognition method, a connection method, and a connection apparatus that can simplify connection operations, and reduce rotational displacement and positional displacement.

Means for Solving the Problem

In order to attain the above-described object, a connection method according to the present invention draws a line serving as a mark on a side surface of a multi-core fiber, and recognizes the rotation angle of the multi-core fiber from the line.

Specifically, the core position recognition method according to the present invention is a core position recognition method for a multi-core fiber, including: drawing, on a side surface of the multi-core fiber, a line having a predetermined length and extending longitudinally from an end of the multi-core fiber; measuring, on a cross section of the multi-core fiber at the end, an angle $\phi$ formed between a straight line passing through a marker of the multi-core fiber and a center of the multi-core fiber, and a straight line passing through the line and the center of the multi-core fiber; observing the multi-core fiber from a lateral side so as to include the end, and measuring an interval $\chi'$ between a longitudinal contour among contours of the multi-core fiber and the line; and calculating a rotation amount $\chi$ of the multi-core fiber using Formula C1:

[Math. C1]

$$\chi = \cos^{-1}\left(\frac{a_1 - \chi'}{a_1}\right) - \phi \quad (C1)$$

where $a_1$ is a radius of the multi-core fiber.

Since the core position recognition method according to the present invention can calculate the rotation angle of the multi-core fiber from a maker on the side surface of the multi-core fiber, it is possible to connect the multi-core fiber to the device while adjusting the rotation angle of the multi-core fiber in the case of forming a waveguide after connecting the multi-core fiber to a glass substrate or the like, the waveguide can be formed, taking the rotation angle into consideration.

Here, the end of the multi-core fiber and the device serving as a connection destination are preferably connected in the following manner. When performing the core position recognition method, the end of the multi-core fiber and the device are connected between the measuring of the angle $\phi$ and the measuring of the interval $\chi'$, whereby the acquisition of a fiber end-face image and the bonding/fixing can be performed in the same step.

Such a connection method can be realized using the following connection apparatus.

The connection apparatus includes: a connector that connects an end of a multi-core fiber and a device serving as a connection destination; a camera that observes the multi-core fiber from a lateral side so as to include the end; an interval measuring instrument that measures, from an image observed by the camera, an interval $\chi'$ between a longitudinal contour among contours of the multi-core fiber, and a line drawn on a side surface of the multi-core fiber, the line having a predetermined length and extending longitudinally from the end of the multi-core fiber; and a calculator that calculates a rotation amount X of the multi-core fiber using Formula C1.

In the above-described apparatus, when the connector has a rotation function of rotating the multi-core fiber based on the rotation amount $\chi$, the acquisition of a fiber end-face image and the bonding/fixing can be performed in the same step.

That is, the method and the apparatus according to the present invention allow the acquisition of a fiber end-face image and the bonding/fixing to be performed in the same step, thus making it possible to reduce the connection loss resulting from the rotational displacement and the positional displacement of the multi-core fiber.

Therefore, the present invention can provide a core position recognition method, a connection method, and a connection apparatus that can simplify connection operations, and reduce rotational displacement and positional displacement.

Preferably, a plurality of the lines are drawn, the rotation amount χ is calculated for each of the lines, and the rotation amounts χ calculated for each of the lines are averaged. This can improve the rotation angle accuracy.

Preferably, when an arrangement of cores of the multi-core fiber is a hexagonal close-packed arrangement, the lines are drawn at 60° intervals, as viewed from a cross section of the multi-core fiber at the end, the number of the lines being 6, when the arrangement is a tetragonal lattice arrangement, the lines are drawn at 90° intervals, as viewed from the cross section of the multi-core fiber at the end, the number of the lines being 4, and when the arrangement is a single-layer annular arrangement, the lines are drawn at equal intervals, as viewed from the cross section of the multi-core fiber at the end, the number of the lines being a number that is a minimum value of 4 or more and is a divisor of the number of the cores.

Preferably, the connection apparatus according to the present invention further includes an angle measuring instrument that observes the cross section of the multi-core fiber at the end and measures the angle φ, before the multi-core fiber is connected to the device, or a renderer that draws the line on the side surface of the multi-core fiber. This allows a series of connection operations to be performed in the same step, thus making it possible to simply the operations.

Note that the above-described aspects of the invention can be combined whenever possible.

Effects of the Invention

The present invention can provide a core position recognition method, a connection method, and a connection apparatus that can simplify connection operations, and reduce rotational displacement and positional displacement.

DESCRIPTION OF EMBODIMENTS

Figure 1:
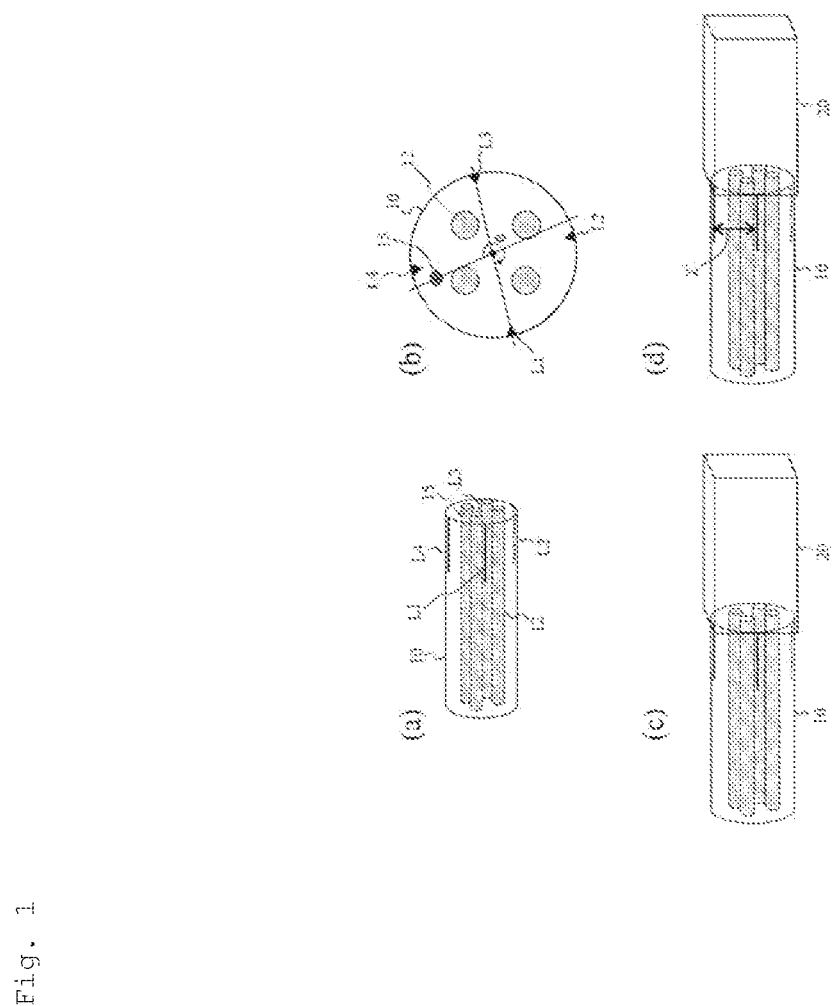
FIG. 1 shows diagrams illustrating a connection method according to the present invention.

Embodiments of the present invention will be described with reference to the accompanying drawings. The embodiments described below are examples of the present invention, and the present invention is not limited to the following embodiments. Note that components with the same reference numerals in the present specification and the drawings denote components that are identical to each other.

Embodiment 1

Figure 2:
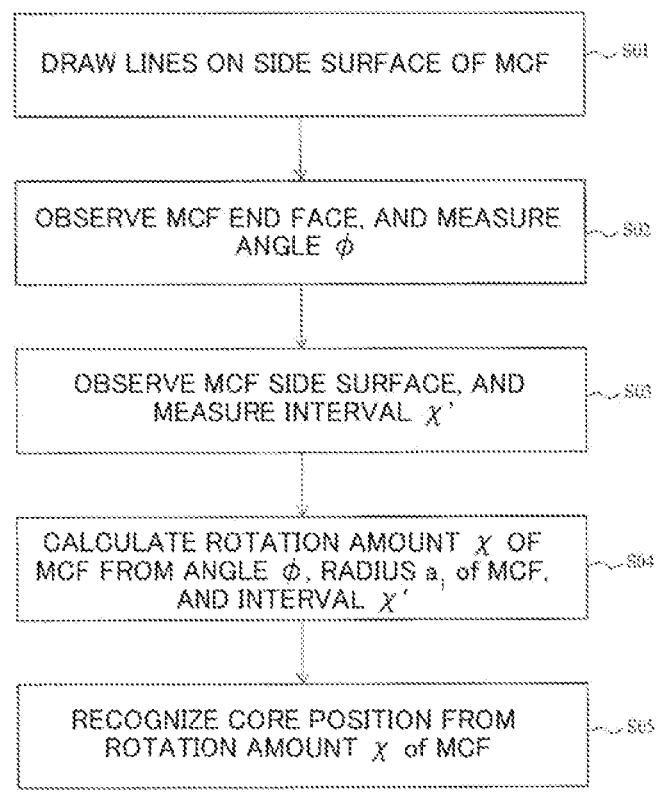
FIG. 2 is a diagram illustrating a core position recognition method according to the present invention.

FIG. 1 snows diagrams illustrating a connection method for connecting a multi-core fiber (MCF) 10 and a transparent glass substrate 20. Although the number of cores of the MCF 10 in the drawing is 4 as an example, the MCF may have any number of cores. FIG. 2 is a flowchart illustrating a core position recognition method adopted in this connection method.

This connection method first performs a step of drawing, on a side surface of the multi-core fiber 10, lines (L1 to L4) having a predetermined length and extending longitudinally from an end of the multi-core fiber 10 (step S01). FIG. 1(a) is a diagram illustrating this step. In this step, lines (L1 to L4) having a length that can be observed from the outside are drawn on the surface of the MCF 10, using a femtosecond laser, for example. Although four lines are drawn in this drawing, any number of lines may be drawn.

Subsequently, this connection method performs a step of measuring, on a cross section of the multi-core fiber 10 at the end, an angle formed between a straight line passing through a marker 15 of the multi-core fiber 10 and a center Ce of the multi-core fiber 10, and a straight line passing through the above-described lines and the center Ce of the multi-core fiber 10 (step S02). FIG. 1(b) is a diagram illustrating this step. In this step, a cross section (fiber end face) of the MCF 10 on which the lines have been drawn is observed, and the positional relationship between the marker 15 and any of the lines (e.g., L1) is recognized. Specifically, an angle φ formed between a straight line connecting the marker 15 and the center Ce, and a straight line connecting the line and the center Ce is measured. Note that the marker 15 is marking for recognizing the positions of the cores 12, and the relative position between each of the cores 12 and the marker 15 is known.

Figure 3:
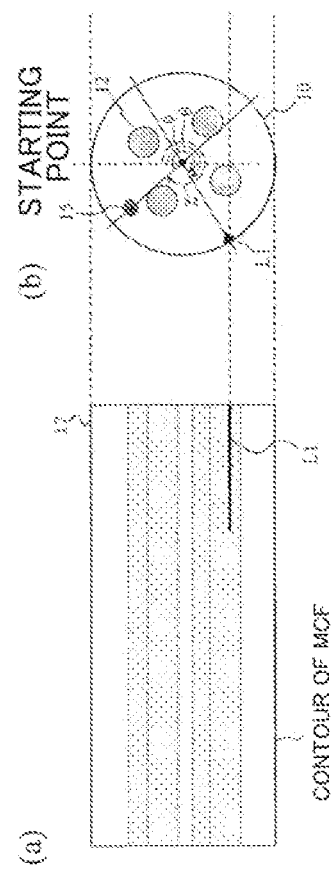
FIG. 3 shows diagrams illustrating the core position recognition method according to the present invention.

Subsequently, this connection method performs a step of observing the multi-core fiber 10 from a lateral side so as to include the end, and measuring an interval χ' between a longitudinal contour 17, which is one of contours of the multi-core fiber 10, and the line L1 (step S03). FIG. 3(a) is a diagram illustrating this step. In this step, the MCF 10 is observed from the side surface, and contours of the MCF 10 are acquired. Then, the distance χ' between the line L1 and the contour 17 located at a side edge of the fiber among these contours is measured.

Subsequently, this connection method performs a step of calculating the rotation amount χ of the multi-core fiber using Formula C1 (step S04). FIG. 3(b) is a diagram illustrating this step. Using the distance χ' and a radius $a_1$ of the MCF 10, the angle φ of clockwise rotation with a point on the MCF 10 as a "starting point" is determined from the following formula. Here, the radius $a_1$ is known.

[Math. 1]

$$a_1 - a_1\cos\theta = \chi' \quad (1)$$

$$\theta = \cos^{-1}\left(\frac{a_1 - \chi'}{a_1}\right)$$

Furthermore, using θ, the rotation amount of the marker 15, that is, the rotation amount χ of the MCF 10, from the starting point shown in FIG. 3(b) is recognized from the following formula:

[Math. 2]

$$\chi = \theta - \phi \quad (2)$$

Substituting Formula (1) into Formula (2) can give Formula C1.

[Math. C1]

$$\chi = \cos^{-1}\left(\frac{a_1 - \chi'}{a_1}\right) - \phi \qquad (C1)$$

Since the relative position between the marker 15 and the cores 12 is known, the arrangement of the cores can be recognized from the rotation amount $\chi$ (step S05).

In this connection method, the angle $\phi$ of the MCF 10 on the fiber end face may be measured in step S02, and therefore the fiber end face of the MCF 10 and the transparent glass substrate 20 can be connected after completion of step S02 and before step S03 (FIG. 1(c)). By measuring the interval $\chi'$ in a state in which the MCF 10 and the transparent glass substrate 20 are connected, the rotation amount $\chi$ of the MCF 10 can be calculated, and the core position of the MCF 10 can be recognized (FIG. 1(d)). A waveguide is formed on the transparent glass substrate 20 using a femtosecond laser so as to establish connection to the recognized core position.

This connection method forms a waveguide on the transparent glass substrate 20 after connecting the MCF 10 and the transparent glass substrate 20, and therefore there is no misalignment between the cores 12 of the MCF 10 and the waveguide, thus making it possible to reduce the connection loss.

Embodiment 2

Although Embodiment 1 describes a case where the rotation amount $\chi$ of the MCF 10 is recognized using one line L1, the rotation amount $\chi$ of the MCF 10 may be recognized using a plurality of lines. That is, a core position recognition method of the present embodiment is characterized in that a plurality of the lines are drawn, the rotation amount $\chi$ is calculated for each of the lines, and the rotation amounts $\chi$ calculated for each of the lines are averaged.

Figure 4:
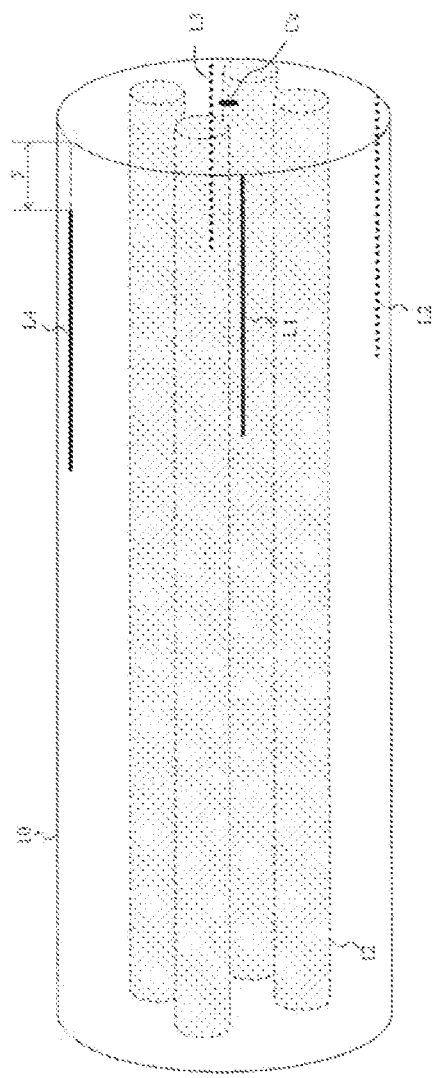
FIG. 4 is a diagram illustrating the core position recognition method according to the present invention.

FIG. 4 is a diagram in which a plurality of lines (L1 to L4) are drawn on the MCF 10. A plurality of lines are formed on the MCF 10 such that the arrangement angle thereof relative to the center Ce is 90° or less. With the method shown in FIG. 2, the core position can be recognized for each of the lines, and the specifying accuracy can be increased by averaging the core positions recognized for each of the lines.

As shown in FIG. 4, it is preferable to form one of the four lines so as to be displaced from the fiber end face by a distance y, and change the line length for each line. By setting lines in this manner, it is possible to easily determine which of a plurality of lines was used to specify a core position when specifying the core position using the lines.

Embodiment 3

Figure 5:
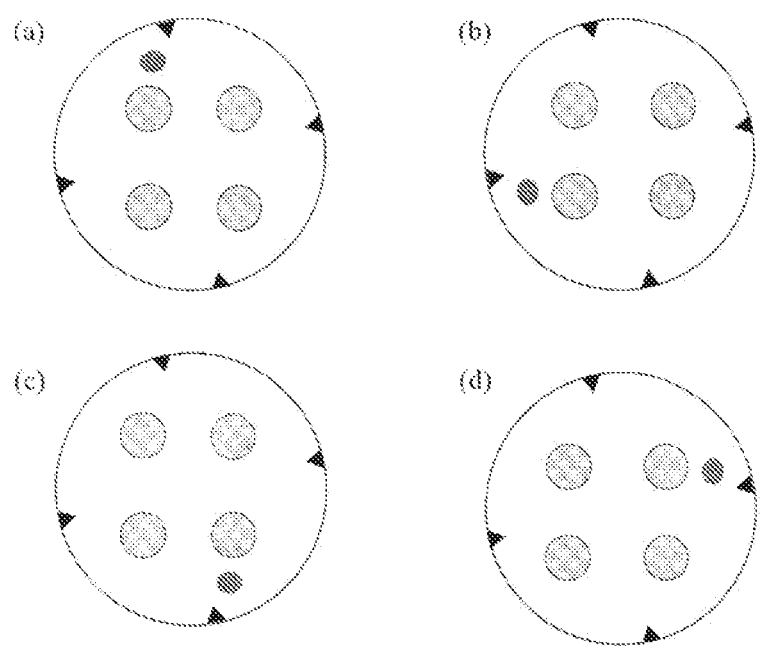
FIG. 5 shows diagrams illustrating the core position recognition method according to the present invention.

Depending on the usage state of the MCF, it may not be necessary to distinguish between the cores. In such a case, it is not necessary to distinguish between the cores using a marker, and only the core position in the fiber may be recognized. For example, this is a case where, as in the case of (a) to (d) in FIG. 5, it is only necessary to recognize the core position although the MCF 10 is rotating.

Figure 6:
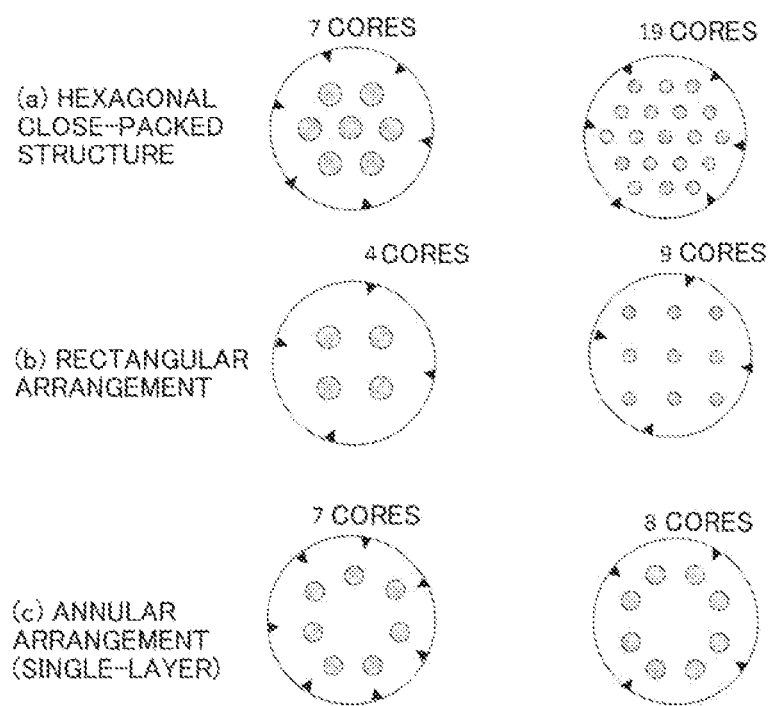
FIG. 6 shows diagrams illustrating the core position recognition method according to the present invention.

In such a case, as shown in FIG. 6, lines are drawn such that the relationship between the cores and the lines is consistent regardless of the rotation amount of the MCF. The required number of lines varies depending on the core arrangement.

When the arrangement is a hexagonal close-packed arrangement, which is 6-fold symmetric, six lines are drawn at 120° intervals.

When the arrangement is a tetragonal lattice arrangement, which is 4-fold symmetric, four lines are drawn at 90° intervals.

When the arrangement is a single-layer annular arrangement, the number of lines is set to be a number that is a minimum of 4 or more and is one of divisors of the number of cores. For example, when the arrangement is a 7-fold symmetric arrangement, seven lines are drawn at 360/7 degree intervals. When the arrangement is an 8-fold symmetric arrangement, four lines are drawn at 90° intervals.

Embodiment 4

Figure 7:
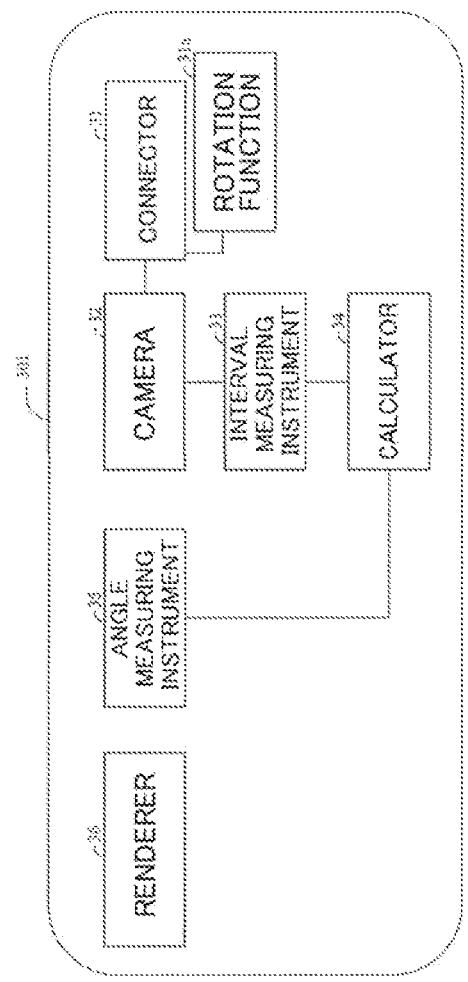
FIG. 7 is a diagram illustrating a connection apparatus according to the present invention.

FIG. 7 is a diagram illustrating a connection apparatus 300 of the present embodiment. The connection apparatus 300 can calculate the rotation amount $\chi$ of the MCF 10 described in Embodiment 1. The connection apparatus 300 includes a connector 31 that connects an end of a multi-core fiber 10 and a device serving as a connection destination; a camera 32 that observes the multi-core fiber 10 from a lateral side so as to include the end; an interval measuring instrument 33 that measures, from an image observed by the camera 32, an interval $\chi'$ between a longitudinal contour among contours of the multi-core fiber 10, and a line drawn on a side surface of the multi-core fiber 10, the line having a predetermined length and extending longitudinally from the end of the multi core fiber; and a calculator 34 that calculates a rotation amount $\chi$ of the multi-core fiber 10 using Formula C1.

The camera 32 and the interval measuring instrument 33 perform step S03 shown in FIG. 2. The calculator 34 performs step S04 shown in FIG. 2. Note that when the connection apparatus 300 includes only the connector 31, the camera 32, the interval measuring instrument 33, and the calculator 34, the angle is separately provided to the calculator 34.

The connector 31 of the connection apparatus 300 has a rotation function 31$a$ of rotating the multi-core fiber 10 based on the rotation amount $\chi$. Provision of the rotation function 31$a$ enables the connection apparatus 300 to connect the MIF 10 by rotating the MCF 10 backward by the rotation amount y relative to the device serving as a connection destination. This eliminates the rotational displacement between the device and the MCF 10, thus making it possible to reduce the connection loss.

The connection apparatus 300 further includes an angle measuring instrument 35 that observes the cross section of the multi core fiber 10 at the end and measures the angle $\phi$, before the multi-core fiber 10 is connected to the device. The angle measuring instrument 35 performs step S02 shown in FIG. 2. Since the connection apparatus 300 also includes the angle measuring instrument 35, the connection apparatus 300 can measure the angle $\phi$ by itself.

The connection apparatus 300 further includes a renderer 36 that draws the line on the side surface of the multi-core fiber 10. The renderer 36 performs step S01 shown in FIG. 2. The renderer 36 performs a processing function for drawing the line, and is a femtosecond laser processing machine, for example.

The connection apparatus 300 includes a first function of confirming the cross section of the MCF 10 after the line has been drawn, and recognizing the positional relationship between the cores, the marker, and the line. Furthermore, the connection apparatus 300 includes a second function of confirming the position of the line from the side surface of the MCF 10, and recognizing the rotation amount x of the MCF 10 from the position. Furthermore, the connection apparatus 300 includes a third function of connecting the MCF 10 to a glass substrate to which connection is to be established. By adding a rotation function of rotating the MCF 10 to the third function, the connection apparatus 300 can be applied to an operation of connecting an optical device with a built-in optical waveguide and the MCF 10.

Note that the second function and the third function including the fiber rotation function need to be integrated because the rotation amount χ changes when the MCF 10 is reinstalled.

Appendix

The following is a description of the connection apparatus according to the present invention.

Problem

Alignment of a MCF involves performing rotation alignment according to the core position, and the rotation alignment has the problem of an increased loss due to rotational displacement, and complication of connection operations. This is caused by the fact that the acquisition of a fiber end-face image and the bonding/fixing are performed in different steps. The rotational and positional displacements of the fiber caused at the time of bonding/fixing the fiber results in a connection loss.

Solving Means

The connection apparatus according to the present invention includes a function capable of acquiring the rotation amount of an MCF during the bonding/fixing step. Specifically, the connection apparatus of the present invention uses an MCF with lines drawn on a side surface thereof, thereby recognizing the rotation amount of the MCF from the side surface, and calculating the absolute positions of the cores.

Effects

The connection apparatus according to the present invention can recognize the absolute positions of the cores from a side image of an MCF in a state in which the MCF has been rotated. By forming a waveguide on a glass substrate serving as a connection destination so as to match the absolute positions of the cores, the rotational and positional displacements of the MCF can be eliminated, thus making it possible to reduce the connection loss.

Note that the connection apparatus according to the present invention can be utilized, for example, for connecting MCFs to each other, and producing devices used for MCFs.

REFERENCE SIGNS LIST

10 Multi-core fiber (MCF)
12 Core
15 Marker
17 One of contours
20 Glass substrate or device
Ce Center
L1 to L4 Line

The invention claimed is:
1. A core position recognition method for a multi-core fiber, comprising:
    drawing, on a side surface of the multi-core fiber, a line having a predetermined length and extending longitudinally from an end of the multi-core fiber;
    measuring, on a cross section of the multi-core fiber at the end, an angle φ formed between a straight line passing through a marker of the multi-core fiber and a center of the multi-core fiber, and a straight line passing through the line and the center of the multi-core fiber;
    observing the multi-core fiber from a lateral side so as to include the end, and measuring an interval χ' between a longitudinal contour among contours of the multi-core fiber and the line; and
    calculating a rotation amount χ of the multi-core fiber using Formula C1:

[Math. C1]

$$\chi = \cos^{-1}\left(\frac{a_1 - \chi'}{a_1}\right) - \phi \quad \text{(C1)}$$

where $a_1$ is a radius of the multi-core fiber.

2. The core position recognition method according to claim 1,
    wherein a plurality of the lines are drawn, the rotation amount χ is calculated for each of the lines, and the rotation amounts x calculated for each of the lines are averaged.

3. The core position recognition method according to claim 1,
    wherein, when an arrangement of cores of the multi-core fiber is a hexagonal close-packed arrangement, the lines are drawn at 60° intervals, as viewed from a cross section of the multi-core fiber at the end, the number of the lines being 6,
    when the arrangement is a tetragonal lattice arrangement, the lines are drawn at 90° intervals, as viewed from the cross section of the multi-core fiber at the end, the number of the lines being 4, and
    when the arrangement is a single-layer annular arrangement, the lines are drawn at equal intervals, as viewed from the cross section of the multi-core fiber at the end, the number of the lines being a number that is a minimum value of 4 or more and is a divisor of the number of the cores.

4. A connection method for connecting an end of a multi-core fiber and a device serving as a connection destination,
    wherein, when performing the core position recognition method according to claim 1,
    the end of the multi-core fiber and the device are connected between the measuring of the angle φ and the measuring of the interval χ'.

5. A connection apparatus, comprising:
    a connector that connects an end of a multi-core fiber and a device serving as a connection destination;
    a camera that observes the multi-core fiber from a lateral side so as to include the end;
    an interval measuring instrument that measures, from an image observed by the camera, an interval χ' between a longitudinal contour among contours of the multi-core fiber, and a line drawn on a side surface of the multi-core fiber, the line having a predetermined length and extending longitudinally from the end of the multi-core fiber; and a calculator that calculates a rotation amount x of the multi-core fiber using Formula C1:

[Math. C1]

$$\chi = \cos^{-1}\left(\frac{a_1 - \chi'}{a_1}\right) - \phi \qquad (C1)$$

where $a_1$ is a radius of the multi-core fiber, and an angle $\phi$ is an angle formed between a straight line passing through a marker of the multi-core fiber and a center of the multi-core fiber, and a straight line passing through the line and the center of the multi-core fiber, on a cross section of the multi-core fiber at the end.

6. The connection apparatus according to claim 5, wherein the connector has a rotation function of rotating the multi-core fiber based on the rotation amount $\chi$.

7. The connection apparatus according to claim 5, further comprising an angle measuring instrument that observes the cross section of the multi-core fiber at the end and measures the angle $\phi$, before the multi-core fiber is connected to the device.

8. The connection apparatus according to claim 5, further comprising a renderer that draws the line on the side surface of the ulticore fiber.

* * * * *